United States Patent
DiSabatino

(10) Patent No.: US 10,448,583 B2
(45) Date of Patent: Oct. 22, 2019

(54) DISC SAW FELLING HEAD FOR A FELLER BUNCHER

(71) Applicant: DEERE & COMPANY, Moline, IL (US)

(72) Inventor: Benjamin DiSabatino, Brantford (CA)

(73) Assignee: DEERE & COMPANY, Moline, IL (US)

( * ) Notice: Subject to any disclaimer, the term of this patent is extended or adjusted under 35 U.S.C. 154(b) by 147 days.

(21) Appl. No.: 14/874,844

(22) Filed: Oct. 5, 2015

(65) Prior Publication Data

US 2017/0094915 A1 Apr. 6, 2017

(51) Int. Cl.
*A01G 23/091* (2006.01)
*A01G 23/081* (2006.01)

(52) U.S. Cl.
CPC ......... *A01G 23/091* (2013.01); *A01G 23/081* (2013.01)

(58) Field of Classification Search
CPC .... A01G 23/08; A01G 23/081; A01G 23/083; A01G 23/085; A01G 23/091; A01G 23/095; G01M 13/04; F16C 43/04; B27B 5/10; B27B 11/12
USPC ......................................... 144/34.1, 4.1, 336
See application file for complete search history.

(56) References Cited

U.S. PATENT DOCUMENTS

| | | | | |
|---|---|---|---|---|
| 1,966,095 A | * | 7/1934 | Herrmann | F16C 19/386 384/571 |
| 2,003,339 A | * | 6/1935 | Buckwalter | B61F 15/14 384/168 |
| 2,016,923 A | * | 10/1935 | Herrmann | F16C 33/60 219/93 |
| 2,037,206 A | * | 4/1936 | Boden | B60B 35/18 384/564 |
| 2,160,420 A | * | 5/1939 | Scribner | F16C 19/386 384/571 |
| 3,140,129 A | * | 7/1964 | Koss | F16C 33/7889 384/477 |
| 3,522,461 A | * | 8/1970 | Geul | H02K 49/046 310/93 |
| 3,818,957 A | * | 6/1974 | Schoonover | A01G 3/002 144/24.12 |
| 4,154,491 A | * | 5/1979 | Derner | F16C 19/26 384/572 |
| 4,538,768 A | * | 9/1985 | Paskowski, Jr. | B02C 15/004 241/101.2 |

(Continued)

*Primary Examiner* — Shelley M Self
*Assistant Examiner* — Smith Oberto Bapthelus
(74) *Attorney, Agent, or Firm* — Taft Stettinius & Hollister LLP; Stephen F. Rost

(57) ABSTRACT

A disc saw felling head and a method of assembly for the disc saw felling head including a saw mandrel and bearing arrangement. The saw mandrel and bearing arrangement includes a housing, a mandrel, and first and second preset roller bearing packs. One of the roller bearing packs is a tapered roller double-row preset bearing pack and the other of the roller bearing packs is a cylindrical roller single row preset bearing pack. The housing includes a bore and a first and second shelf, wherein each of the shelves defines a depth of the bearings with respect to the housing to accurately locate the mandrel within the housing. The use of preset bearing packs and a housing having predetermined locations for placement of the present bearing packs provides an assembly which requires fewer adjustments.

8 Claims, 4 Drawing Sheets

(56) References Cited

U.S. PATENT DOCUMENTS

| | | | | |
|---|---|---|---|---|
| 4,647,231 | A * | 3/1987 | Harsdorff | F16C 19/386 384/560 |
| 4,700,443 | A * | 10/1987 | Schalk | F16C 19/386 29/453 |
| 4,987,935 | A * | 1/1991 | Corcoran | A01G 23/091 144/241 |
| 5,001,831 | A * | 3/1991 | Vinciguerra | F16C 19/26 29/898.062 |
| 5,004,026 | A * | 4/1991 | MacLennan | A01G 23/081 144/336 |
| 5,113,919 | A * | 5/1992 | MacLennan | A01G 23/091 144/336 |
| 5,228,788 | A * | 7/1993 | Vinciguerra | F16C 19/26 29/447 |
| 5,647,444 | A * | 7/1997 | Williams | E21B 33/085 166/84.1 |
| 5,667,312 | A * | 9/1997 | Grunze | F16C 23/086 384/450 |
| 5,727,610 | A * | 3/1998 | Isley | A01G 23/083 144/336 |
| 5,794,674 | A * | 8/1998 | Kurelek | A01G 23/081 144/336 |
| 5,931,210 | A * | 8/1999 | Kurelek | A01G 23/081 144/336 |
| 5,975,168 | A * | 11/1999 | Ericksson | A01G 23/097 144/208.2 |
| 6,024,311 | A * | 2/2000 | Prairie | B02C 15/04 241/117 |
| 6,074,023 | A * | 6/2000 | Satou | B21C 37/294 305/116 |
| 6,149,244 | A * | 11/2000 | Wagner | B60B 27/001 29/898.07 |
| 6,158,630 | A * | 12/2000 | Mayerle | G01F 13/001 222/413 |
| 6,196,106 | B1 * | 3/2001 | Kurelek | A01G 23/091 83/698.41 |
| 6,315,457 | B1 * | 11/2001 | Kapaan | B60B 27/001 384/544 |
| 6,324,952 | B1 * | 12/2001 | Daly | A01G 23/091 144/34.1 |
| 6,786,645 | B2 * | 9/2004 | Joki | B60B 27/001 384/488 |
| 7,007,727 | B2 * | 3/2006 | DiSabatino | A01G 23/091 144/34.1 |
| 7,007,730 | B2 * | 3/2006 | Wildey | A01G 23/06 144/336 |
| 7,174,932 | B2 * | 2/2007 | Mauchlen | A01G 23/081 144/34.1 |
| 7,228,880 | B2 * | 6/2007 | Taillon | A01G 23/08 144/24.12 |
| 7,371,011 | B2 * | 5/2008 | McKeirnan, Jr. | F01D 25/16 384/504 |
| 7,517,154 | B2 * | 4/2009 | McKeirnan, Jr. | F01D 25/16 384/517 |
| 7,681,608 | B2 * | 3/2010 | Disabatino | A01G 23/08 144/34.1 |
| 7,699,081 | B2 * | 4/2010 | Mauchlen | A01G 23/081 144/34.1 |
| 7,832,437 | B2 * | 11/2010 | Trom | A01G 23/08 144/336 |
| 7,860,663 | B2 * | 12/2010 | Miyasaka | G01H 1/003 702/113 |
| 7,934,523 | B2 | 5/2011 | Little et al. | |
| 8,066,040 | B2 | 11/2011 | Di Sabatino | |
| 8,880,359 | B2 * | 11/2014 | Ince | G01M 13/022 340/679 |
| 9,301,457 | B2 * | 4/2016 | DiSabatino | A01G 23/081 |
| 9,526,217 | B2 * | 12/2016 | DiSabatino | A01G 23/081 |
| 2003/0205291 | A1 * | 11/2003 | DiSabatino | A01G 23/091 144/34.1 |
| 2007/0134106 | A1 * | 6/2007 | McKeirnan, Jr. | F01D 25/16 417/407 |
| 2008/0166081 | A1 * | 7/2008 | Crittenden | F16C 19/46 384/548 |
| 2009/0208159 | A1 * | 8/2009 | Heim | B60B 27/001 384/448 |
| 2012/0312421 | A1 * | 12/2012 | Trom | A01G 23/081 144/4.1 |
| 2014/0003751 | A1 * | 1/2014 | Ito | F16C 41/008 384/448 |
| 2014/0069553 | A1 | 3/2014 | Disabatino | |
| 2014/0140648 | A1 * | 5/2014 | Ito | G06K 19/0723 384/448 |
| 2015/0247532 | A1 * | 9/2015 | Suzuki | F16C 33/6674 384/462 |
| 2015/0337945 | A1 * | 11/2015 | McKinzie | F16D 1/06 403/34 |
| 2017/0089806 | A1 * | 3/2017 | Brownell | F16C 43/04 |
| 2017/0094915 | A1 * | 4/2017 | DiSabatino | A01G 23/081 |

* cited by examiner

DISC SAW FELLING HEAD FOR A FELLER BUNCHER

FIELD OF THE DISCLOSURE

The present invention generally relates to a feller buncher, and more particularly to a disc saw felling head for a feller buncher.

BACKGROUND

Operators use feller bunchers to harvest trees and other wood vegetation. A typical tree feller buncher first cuts the tree and then places the tree in bunches on the ground for further processing with other machines, such as skidders or forwarders. Some tree feller bunchers include a felling head with a cutting device for cutting the trees and an accumulation pocket for receiving and holding one or more felled trees until the felled trees are placed in bunches on the ground.

SUMMARY

According to one aspect of the present invention, there is provided a felling head for a forestry machine configured to cut timber with a rotating saw blade subjected to axial forces and radial forces during cutting of the timber. The felling head includes a housing including a bore, a saw motor supported by the housing, and a mandrel disposed in the bore and defining a longitudinal axis. The mandrel includes a flange to mount the saw blade and being operatively coupled to the motor to be rotationally driven by the saw motor within the bore of the housing. The felling head further includes a first roller bearing and a second roller bearing disposed adjacently to the first roller bearing. The first roller bearing and the second roller bearing are arranged in an opposed configuration, such that one of the first and second roller bearings is configured to resist upward forces along the longitudinal axis and the other of the first and second roller bearing is configured to resist downward forces along the longitudinal axis.

According to another aspect of the present invention, there is provided a felling head for a forestry machine configured to cut timber with a rotating saw blade subjected to axial forces and radial loads during cutting of the timber. The felling head includes a housing including a bore, a saw motor supported by the housing, and a mandrel disposed in the bore and defining a longitudinal axis. The mandrel includes a flange to mount the saw blade and is configured to be operatively coupled to the motor to be rotationally driven by the saw motor within the bore of the housing. A tapered roller preset bearing pack is located on the mandrel at a first location. The tapered roller preset bearing pack includes a first row of tapered roller bearings and a second row of tapered roller bearing. The first row and second row of tapered roller bearings are arranged in an opposed configuration, such that the first row is configured to resist upward forces along the longitudinal axis while the second row is configured to resist downward forces along the longitudinal axis. A cylindrical roller bearing is located on the mandrel at a second location. The cylindrical roller bearing is displaced from the tapered roller preset bearing pack and is configured to resist radial loads applied to the mandrel substantially perpendicular to the longitudinal axis.

According to still another aspect of the present invention, there is provided a method of assembling a felling head of a feller bencher. The method includes fitting a cylindrical roller bearing at a first location on a mandrel; placing a spacer on an outside surface of the mandrel (or other means of axially positioning the bearings such as machined shoulders and/or snap rings); fitting a tapered roller preset bearing pack within a housing; and inserting the mandrel, the cylindrical roller bearing, and the spacer in a bore of the housing, wherein a portion of the mandrel is located within the tapered roller preset bearing pack.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
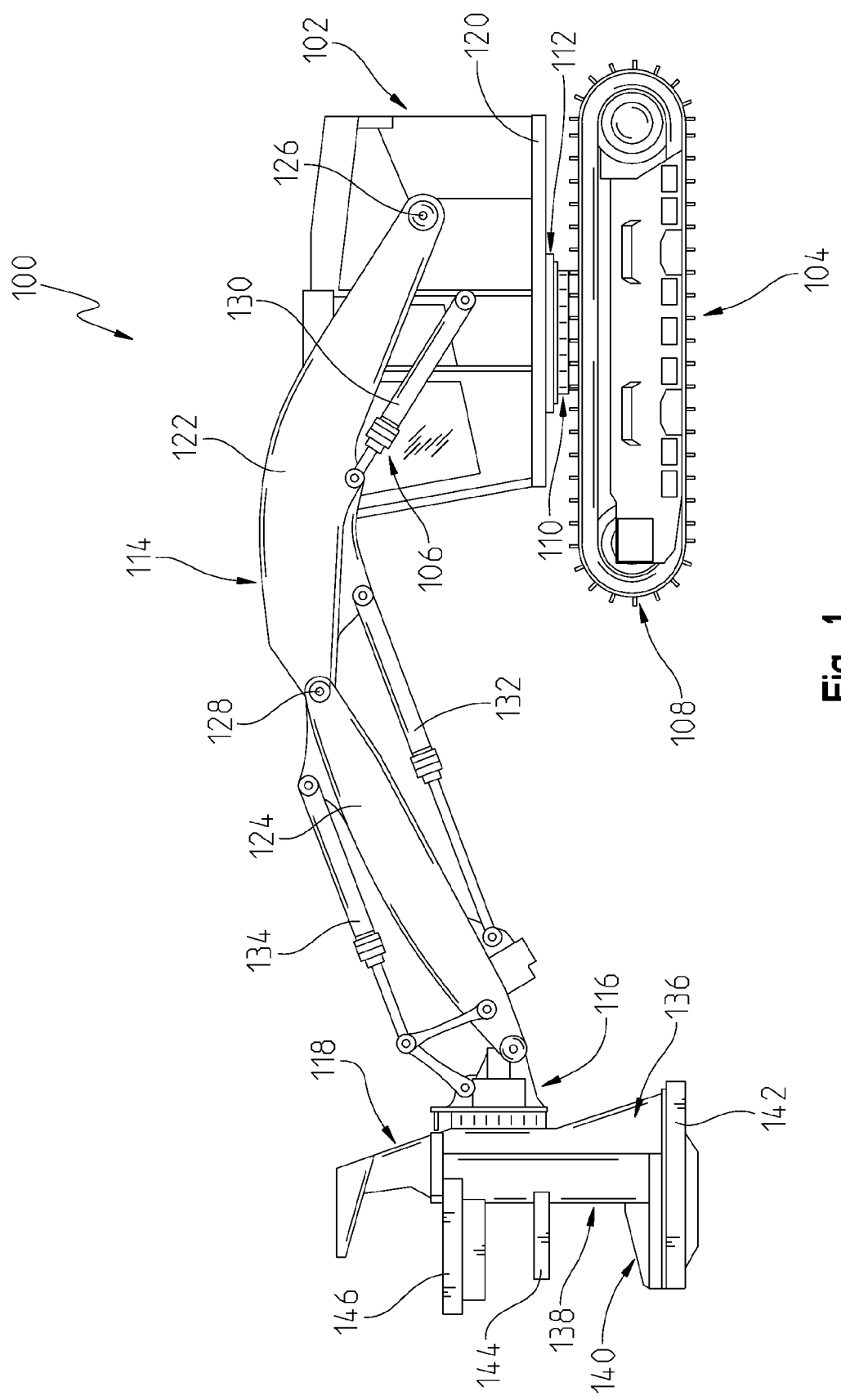
FIG. 1 is a side elevational view of a work machine including a felling head.

For the purposes of promoting an understanding of the principles of the novel invention, reference will now be made to the embodiments described herein and illustrated in the drawings with specific language used to describe the same. It will nevertheless be understood that no limitation of the scope of the novel invention is intended. Such alterations and further modifications of the illustrated apparatus, assemblies, devices and methods, and such further applications of the principles of the novel invention as illustrated herein, are contemplated as would normally occur to one skilled in the art to which the novel invention relates.

In FIG. 1 an example of a work machine, such as a track feller buncher 100, is shown. The present disclosure is not limited, however, to track feller bunchers and other work machines used in the construction, forestry, and agricultural industries having wheels or skids are also included. As such, while the figures and forthcoming description may relate to a track feller buncher, it is to be understood that the scope of the present disclosure extends beyond a track feller buncher, and where applicable, the term "machine" or "work machine" will be used instead. The term "machine" or "work machine" is intended to be broader and encompass other vehicles besides a feller buncher for purposes of this disclosure.

The machine 100 includes an upper frame assembly 102 which is supported by an undercarriage assembly 104. The upper frame assembly 102 can include a cab 106 in which an operator utilizes a plurality of controls (e.g., joysticks, pedals, buttons, screens, etc.) for controlling the machine 100 during operation thereof. The upper frame assembly 102 also includes an engine compartment that houses an engine, such as a diesel engine which provides the motive power for operating the components associated with the machine 100.

Both the cab 106 and the engine compartment can be supported by various frame members that form the upper frame assembly 102.

The undercarriage assembly 104, in one embodiment, includes tracks 108 (e.g., one on a leftside of the machine and another on a rightside thereof) that engage and move along the ground during operation. The tracks 108 are driven by a drive sprocket (not shown) and a front idler wheel (not shown) about which a track chain (not shown) is entrained. A hydraulic motor operably drives the drive sprocket (which may form part of a high reduction gearset) so as to drive the track chain (not shown) thereby providing motive power for moving the machine 100.

The upper frame assembly 102 can be mechanically coupled to the undercarriage assembly 104 by a tilt mechanism and turntable assembly 110. The tilt mechanism and turntable assembly 110 operably controls the machine 100 to be rotated and tilted about one or more axes. A swing assembly 112, for example, includes one or more swing motors for driving rotation of the upper frame assembly 102 relative to the undercarriage assembly 104. Operation of the swing assembly 112 rotates a platform 120 of the upper frame assembly 102 relative to the undercarriage 104.

The work machine 100 includes a boom assembly 114. The boom assembly 114 includes a first boom section 122 pivotably coupled to a second boom section 124. As shown in FIG. 1, one end of the first boom section 122 is pivotably coupled to the upper frame assembly 102 via a first pivot pin 126. An opposite end of the first boom section 122 is pivotably coupled at a second pivot pin 128 to a first end of the second boom section 124. The second boom section 124 includes a second end coupled to a wrist assembly 116. The wrist assembly 116 includes one or more hydraulic motors for powering a work element. As shown in FIG. 1, the work implement coupled to the wrist assembly 116 is a felling head 118 for cutting and bunching trees or other woody vegetation.

The work machine 100 may also include a plurality of actuators for controlling the boom assembly 114 and felling head 118. In the example of FIG. 1, the machine 100 includes a first hydraulic actuator 130, a second hydraulic actuator 132, and a third hydraulic actuator 134.

Felling head 118 includes a support frame 136 supported by the wrist assembly 116. Felling head 118 includes a cutting tool assembly 138 and an accumulation pocket 140 into which felled trees are directed for short-term storage while additional trees are felled. The cutting tool assembly 138 is supported by the support frame 136 and a housing of the support frame 136 surrounds the cutting tool assembly 138. The tree cutting tool assembly 138 is used to cut a tree trunk or vegetation from its roots. According to the exemplary embodiment of the present disclosure, felling head 118 includes a housing 142 and a circular saw blade (not shown) that rotates about an axis of rotation. The majority of blade is covered by saw housing 142, but a portion of the blade is exposed to cut the trees or vegetation.

Frame 136 also pivotably supports a gathering arm 146 and an accumulation arm 144 that gather and hold felled trees in accumulation pocket 140. As shown in FIG. 1, gathering arm 146 is designed to guide cut trees into the accumulating pocket, while accumulation arm 144 is designed to hold the accumulated trees in the pocket. Additional details of an alternative gathering arm are provided in U.S. Pat. No. 5,697,412, the entire disclosure of which is expressly incorporated by reference herein.

Figure 2:
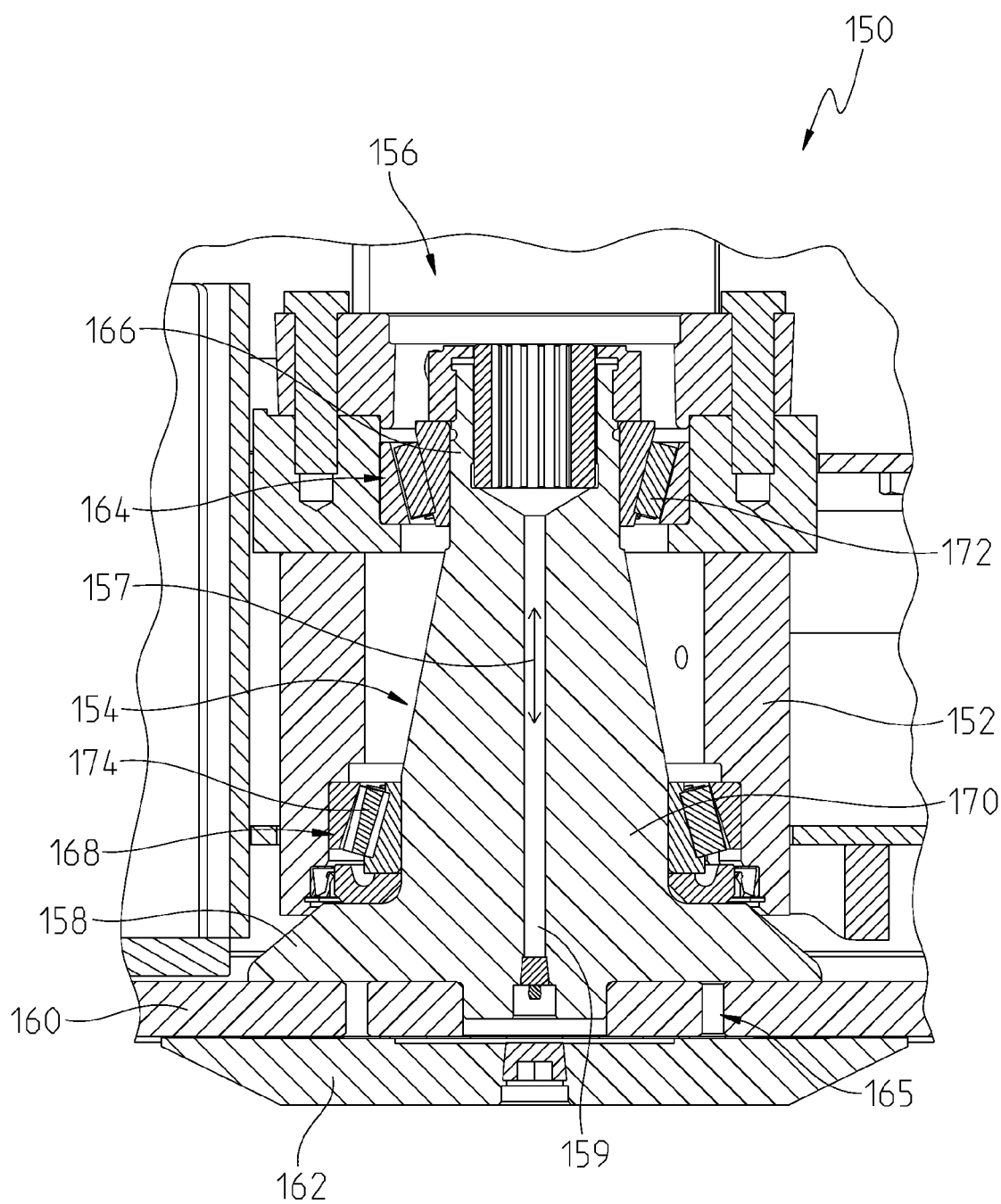
FIG. 2 is a sectional view of a prior art saw mandrel and bearing arrangement for a felling head.

FIG. 2 is a schematic sectional view of a prior art saw mandrel and bearing arrangement for a felling head 150. The felling head 150, a portion of which is shown in FIG. 2 as understood by those skilled in the art, is a part of the cutting tool assembly 138, and includes a generally cylindrical housing 152 which rotatingly supports a mandrel 154 operatively coupled to a motor 156. The mandrel 154 includes a generally cylindrical shape having an axis of rotation about a longitudinal axis 157 which is aligned with a channel 159 running the full length of the mandrel 154 connecting a grease fitting at the bottom with a spline cavity at the top. The purpose of the channel 159 is to provide lubricating grease or oil to the splines, since when using grease lubrication, the grease would otherwise without the channel 159 have a difficult path to reach the splines. Without this directed lubrication, the splines would run dry.

The mandrel 154 is operatively coupled to a first flange 158 to which a circular saw blade 160 is coupled. The circular saw blade 160 is coupled to the flange 158 with a second flange 162. The second flange 162 is operatively connected to the first flange 158 by a plurality of connectors 165, such as bolts, to stationarily fix the saw blade 160 to the first flange 158, as well as to the mandrel 154. FIG. 2 illustrates a schematic sectional view of the mandrel and bearing arrangement about the rotational axis 157, and consequently the illustrated view is for a section cut generally along the middle of the mandrel and bearing arrangement.

An upper bearing 164, supported by the housing 152, rotatingly supports an upper or first end 166 of the mandrel 154 within the housing 152. A lower bearing 168, supported by the housing 152, rotatingly supports a lower or second end 170 of the mandrel 154 within the housing 152. The upper bearing 164 is a tapered roller single row bearing having a bottom end of each of a plurality of rollers 172 angled toward the axis rotation 157. The lower bearing 168 is a tapered roller single row of bearings having a top end of each of a plurality of rollers 174 angled toward the axis rotation 157. Each of the first and second bearings 164 and 168 each include an inner ring disposed adjacently to and fixed to the mandrel 154 and an outer ring disposed adjacently to and fixed to the housing 152. Each of the inner rings and outer rings include raceways into which the rollers 172 and 174 fit and in which rotation of the bearings occurs. The rollers 172 and 174 thereby provide for the rotation of the mandrel 154 within the housing 152.

The arrangement 150 of FIG. 2 requires a clearance, or gap, between the bearing rollers 164 and 174 and the associated raceways to allow grease to properly circulate so as to not overheat the raceways. The clearance between the bearings 172 and 174 and the respective raceways is a small one and is very difficult measure, as well as to properly adjust. For instance, to reduce heat generation, the bearings 164 and 174 are installed with a clearance resulting in a measured end-play of 0.003 to 0.006 inch (0.08 to 0.15 mm). This clearance, while ensuring that the bearings are not constantly loaded and that grease can circulate around the rolling elements, is difficult to measure as well as to adjust. In another known bearing pack, an internal spacer is used on the bearings to control the spacing. If used in the arrangement 150, however, such bearings would require that the spacer be custom made for each assembly, or that each part of the assembly is precision made to achieve an overall end play of 0.003 inches to 0.006 inches, an expensive proposition.

The adjustment of the clearance is compounded by press fits of the bearings 164 and 170 to the housing 152 or to the mandrel 154. Additionally, the arrangement 150 includes a number of large components, which makes the setting of the clearances more difficult. Consequently, an individual assembling the assembly, along with making sensitive measurements for adjustment, must also develop a "feel" based on experience for adjusting the clearance settings. Correct assembly of the illustrated arrangement is therefore time consuming and skill intensive, and not well suited to a production environment.

The clearance is set by the assembler during assembly of a mandrel subassembly. The bearings are pressed in place, and the mandrel subassembly is retained with a nut threaded onto the mandrel. The end-play is set by turning the nut in or out to achieve the correct end-play. Care and skill are required to adjust the nut, which requires a very meticulous procedure to achieve proper setting. If the bearings are too tight, one or more of the bearings will overheat and self-destruct during operation of the saw. If the clearance is too large, the fitting of the bearings is too loose and the rollers can lift off the raceway and lose rolling contact. As a result, the useful life of the bearing is reduced. The set-up or adjustment of the clearance is further complicated by the fact that the bearings are press-fitted on the mandrel to a predetermined position, making fine adjustment even more difficult. Because the bearing set-up is so critical to the proper performance of the assembly, what is needed is a process of assembly proofing the adjusting step by reducing or removing the human factor and to ensure consistent set-up from one assembly to the next.

Figure 3:
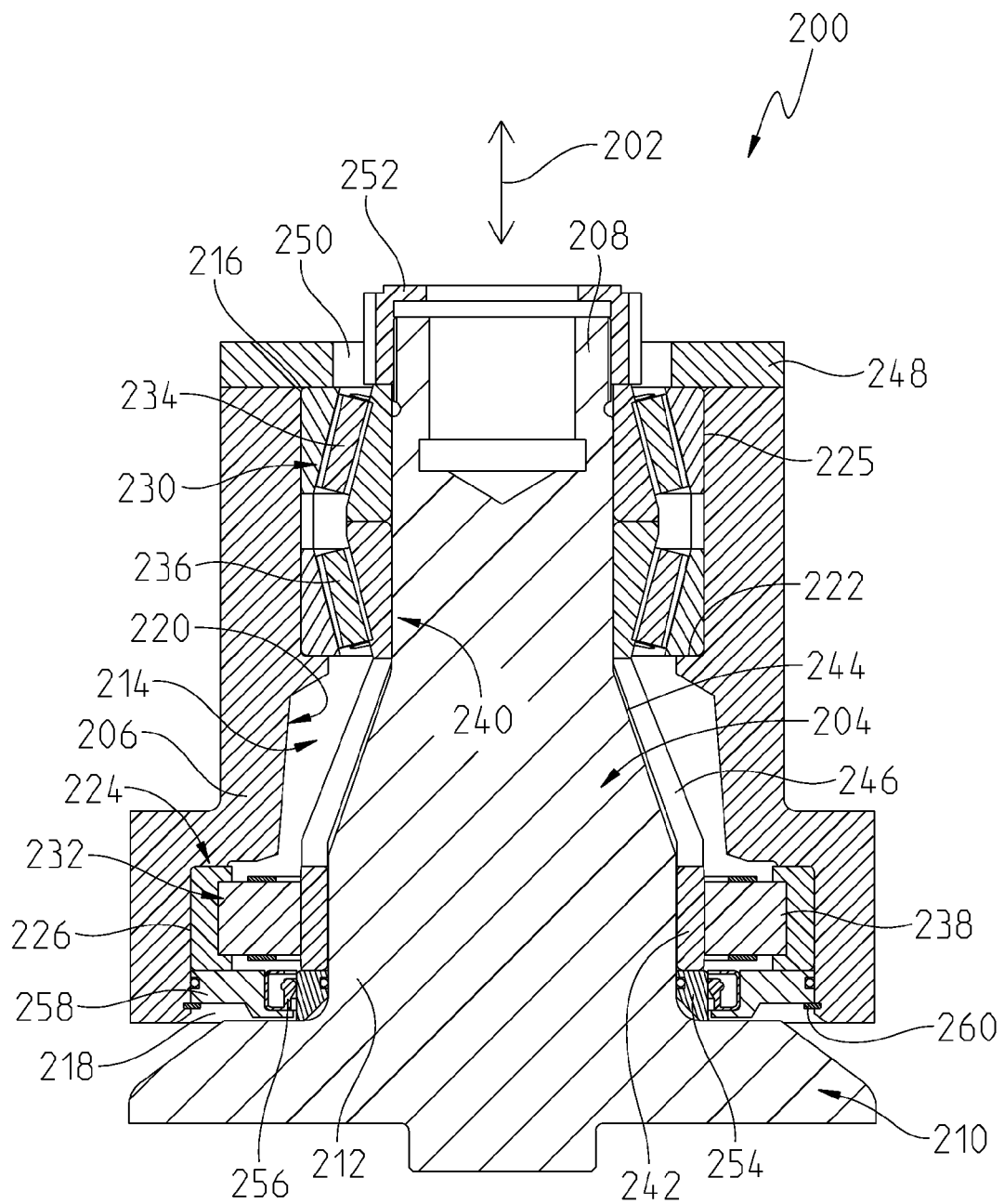
FIG. 3 is a sectional view of one embodiment of a saw mandrel and bearing arrangement for a felling head.

FIG. 3 is a sectional view of one embodiment of a saw mandrel and bearing arrangement 200 for a felling head of the present invention. The sectional view of FIG. 3 is taken along a centerline of the arrangement 200 defined by a longitudinal axis 202. The arrangement 200 includes a mandrel 204 rotationally disposed within a housing 206. The mandrel defines portions which are substantially cylindrical with different portions having different diameters. A motor (not shown) is coupled to the mandrel 204 at an upper or first end 208 of the mandrel. 204. A flange 210 is mounted at a bottom or second end 212 of the mandrel 204. A saw blade (not shown) is coupled to the flange 210 for mounting of the saw blade.

The housing 206 includes a bore 214 defining a central cavity in which the mandrel 204 is located. The bore 214 defines a first open end 216 and a second open end 218 of the housing as well as an interior surface 220. The interior surface 220 of the bore generally defines an interior sidewall having different diameters and is configured to provide a first shelf 222 and a second shelf 224. The interior sidewall 220, disposed between the first shelf 222 and the open end 216, defines a first bearing sidewall 225 having a first diameter. The sidewall 225 is generally parallel to the axis 202. The interior sidewall 220 disposed between the second shelf and the open end 218 defines a second bearing sidewall 226 having a second diameter. The sidewall 226 is generally parallel to the axis 202. The interior sidewall 220, disposed between the first shelf 222 and the second shelf 224, is angled with respect to the axis 202. In other embodiments, this sidewall is not angled but includes a cylindrical side generally parallel to the axis 202. Other shapes of the sidewall are possible.

The housing 206, in different embodiments, is configured of one or more parts, which are formed to include the interior sidewall 220. The one or more parts, in different embodiments, are a cast or a machined part of sufficient precision to locate an upper or first bearing 230 within bore 214 adjacent to the first bearing sidewall 225 and a lower or second bearing 232 within the bore 214 adjacent to the second bearing sidewall 226. In addition, the location of the shelf 222 and the shelf 224 are determined to set the depth of each of the bearing packs 230 and 232 within the bore 214.

The first bearing pack 230, in one embodiment, is a preset, tapered roller, double row roller bearing having a first plurality of roller bearings 234 and a second plurality of roller bearings 236. Adjacent ends of the roller bearing 234 and 236 are spaced further away from the mandrel than opposed ends of the bearings. The preset bearing pack 230 includes two tapered roller bearings arranged in an opposing configuration. The bearings 234 and 236, therefore, are situated in a back-to-back configuration and have axis of rotation inclined with respect to the axis 202. By configuring the bearings 234 and 236 in such a position, one set of rollers is configured to oppose longitudinal forces along the axis 202, in a first direction, and the other set of rollers is configured to oppose longitudinal forces in a second direction, opposite the first direction. The pre-set and assembled bearing pack 230 also has radial load carrying capacity. A "radial load" is a load experienced by bearing pack which is substantially perpendicular to the longitudinal axis of the mandrel. The two bearings 230 and 232 are specifically manufactured as an assembly and are set with a specified clearance, or preload, depending on the applications requirement. In another embodiment, the bearings 234 and 236 are arranged wherein adjacent ends of the bearings are radially closer to the mandrel than opposed ends of the bearings are to the mandrel.

The second bearing 232 is a preset, cylindrical roller, single row bearing, having a plurality of roller bearings 238, each having an axis of rotation generally parallel to the axis 202. The second bearing 232 is configured to oppose forces generally perpendicular to the axis of rotation 202. In one or more embodiments, the preset tapered roller double-row bearing 230 and the preset, cylindrical roller, single row bearing 232 are available from a number of manufacturers. In other embodiment, the bearings 230 and 232 are custom bearings having preset bearings configured to be used under anticipated operating conditions. Preset bearings are those bearings in which the clearance between rollers and the raceway are set by the manufacturer and no adjustment is required at assembly. A spacer between the two outer races (in this embodiment) is selected to provide a prescribed roller clearance.

The mandrel 204 includes a first generally cylindrical sidewall 240 having a circumference sized to fit within an interior circumference of the first bearing 230. The mandrel further includes a second generally cylindrical sidewall 242 having a circumference sized to fit within an interior circumference of the second bearing 232. An angled sidewall 244 of the mandrel 204 is configured to locate a sleeve or spacer 246 between the first bearing 230 and the second bearing 232. The spacer 246 includes a first end disposed adjacently to the first bearing 230 and a second end disposed adjacently to the second bearing 232. An end plate 248 is located at the open end 216 of the housing to hold in place the bearing 230. The end plate 248 includes an aperture 250 through which the mandrel 204 extends. A retainer nut 252 includes interior threads interfacing with exterior threads of the mandrel. The nut 252 is screwed onto the mandrel 204 to retain the first bearing 230 within the housing 206. An inner diameter of the nut 252 is splined such that when a spline adapter, when installed, locks the nut 252 to the mandrel 204. Due to the configuration of the mandrel 204, the housing 206, and the use of preset bearing packs including arrangement of the bearings within the preset bearing packs, the configuration of the assembly 200 substantially reduces or eliminates the need for complicated and time intensive assembly and adjustment.

The assembly of the arrangement 200 includes providing a mandrel subassembly, which once assembled, is placed into the housing for further assembly to complete the arrangement 200. In one embodiment, the flange 210 is connected to the mandrel 204. In another embodiment, the flange 210 is connected to the mandrel as one of the remaining steps of assembly. In other embodiments, the flange 210 and the mandrel 204 are a one piece part made from a single forging. Once connected, a spacer 254 is press fit onto the mandrel 204. After the spacer 254 is in place, an inner ring of the lower bearing 232 is place onto the mandrel 204 at a location adjacent to the spacer 254. The spacer 246 is placed adjacently to the inner ring of the lower bearing 232. Once the spacer 254, the inner ring, and the spacer 246 are in place, the mandrel subassembly is complete.

The next step is to prepare a housing subassembly which includes pressing the lower bearing 232 into position adjacently to the second bearing sidewall 226. In this embodiment, the rollers are part of the lower bearing 232. The outer ring of the lower bearing 232 is pressed along the sidewall 226 and into contact with the second shelf 224. Once the outer ring is in place, a shaft seal 256 and a seal plate 258 are located adjacently to the outer ring of the lower bearing 232. Depending on the configuration of the assembly 200, the seal plate 258, in one embodiment, is not included. Once the shaft seal 256 and seal plate 258 are located, a snap ring 260 is located in a slot in the housing 206. After locating the snap ring 260, the outer raceway of upper bearing 230 is placed adjacently to the sidewall 225 and in contact with the first shelf 222. In one embodiment, the bearing 230 is press fit into place.

Once the bearing 230 is in place, the mandrel subassembly is inserted into the housing subassembly through an open end adjacent to the location of and through the shaft seal 256. The mandrel subassembly is moved through this end so that the inner ring of the lower bearing 232 slides into the rollers of the lower bearing 232. Next, the lower cone of bearing 230 is pressed into place until it seats onto the end surface of spacer 246. The upper cone is now pressed into position until it seats adjacent to the lower cone. The outer raceway spacer and upper, outer raceway of bearing 230 is now installed. Note that the spacer could be installed after the lower cone is in place giving better access. Once the mandrel subassembly is seated, the nut 252 is threaded onto corresponding threads of the mandrel 204. After the nut 252 is in place, the end plate 248, which includes the aperture 250, is placed over the nut 252, and is fixed to the housing 206 to maintain the location of the upper bearing 230. The end plate 248 is fixed to the housing with bolts or other connectors (not shown). The bearing packs are manufactured with precise internal tolerances as well as mounting tolerances to enable them to be installed in precision machined bores without further settings required. The tolerance depends on the application in which the assembly 200 is used and other tolerances are possible depending on the application. The clearance between the rollers and the raceways in both the axial direction along the axis 202 and the radial direction is determined based on the type of lubrication being used in the bearings 230 and 232. In different embodiments, oil lubrication of the assembly is used.

Figure 4:
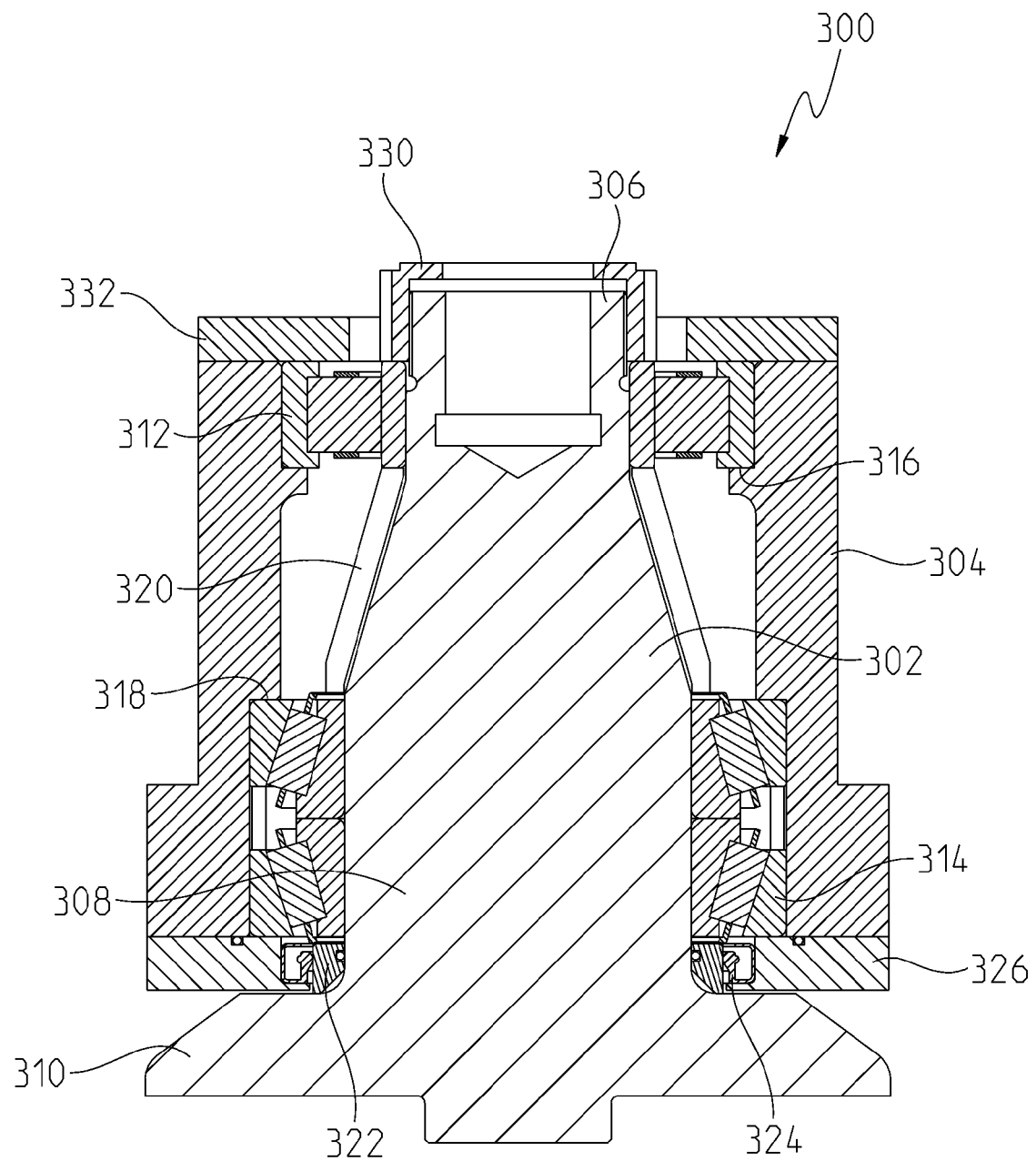
FIG. 4 is a sectional view of another embodiment of a saw mandrel and bearing arrangement for a felling head.

FIG. 4 is a sectional view of another embodiment of a saw mandrel and bearing arrangement 300 for a felling head. In this embodiment, the arrangement includes a mandrel 302 disposed in a housing 304. A motor (not shown) is operatively connected to the mandrel 302 at a first end 306. A second end 308 of the mandrel 302 is operatively connected to a flange 310 to which a saw blade (not shown) is attached. In this embodiment, a first or upper bearing 312 is disposed toward the first end 306 of the housing 304 and a second or lower bearing 314 is disposed toward the second end 308. In the embodiment of FIG. 4, the upper bearing 312 is a cylindrical roller single row preset bearing similar in construction to the lower bearing 232 of FIG. 3 and the lower bearing 314 is a tapered roller, double row preset bearing similar in construction to the upper bearing 230 of FIG. 4.

To accommodate the location of the upper bearing 312, the housing 304 includes a first shelf 316 to locate the first bearing 312. The housing 304 further includes a second shelf 318 to locate the second bearing 314. The location of the each of the shelves 316 and 318 is selected to set the depth of each of the bearing packs.

A first spacer 320, located on the outside of the mandrel 302, is in contact with the inner rings of each of the first and second bearings 312 and 314 to provide a support location for each of the inner rings. A second spacer 322 is located adjacently to the mandrel 302, and in one embodiment, abuts the inner ring of the second bearing 314. A shaft seal 324 is located adjacently to the spacer 322 and a seal plate 326 is located adjacently to the shaft seal 326. In this embodiment, the seal plate 326 is coupled to the housing 304 with bolts or other connectors to maintain the location of the shaft seal 324 and the bearing 314.

A nut 330 is threaded onto cooperating threads of the mandrel 302. An end plate 332 is fixed to the housing 304 with bolts or other connectors to maintain the location of the bearing 312.

As can be seen in the embodiment of FIG. 4, the location of the preset cylindrical single row bearing and the tapered roller double row preset bearing are reversed from the locations of FIG. 3. Consequently, the assembly of the assembly 300 requires a different order of assembly of the parts, but still includes the assembly of a mandrel subassembly and a housing subassembly. In this embodiment, the mandrel subassembly includes locating the spacer 322 on the mandrel 302. In this embodiment, the spacer 322 is placed on the mandrel 302, which completes the mandrel subassembly. The lower bearing pack 314, including the seal 324 and the seal plate 326, are preassembled to the housing to form a housing sub-assembly.

The lower bearing pack 314 is pressed in until the outer raceway seats adjacent to shelf 318. The seal 324 is pressed into the cavity of seal plate 326. The seal plate is assembled onto the housing adjacent to the lower bearing pack and retained with screws or other suitable means (not shown).

Next, the mandrel sub-assembly is inserted into the housing. Suitable tooling is required to press the shaft through the lower bearing pack such that the end of the inner raceway seats adjacent to the spacer 322.

The spacer 320 can now be assembled, followed by the upper bearing 312. The outer part of the upper bearing seats adjacent to the shoulder 316, while the inner raceway seats onto the end surface of spacer 320.

Next the nut 330 and the end plate 332 are attached as previously described to complete the assembly.

While exemplary embodiments incorporating the principles of the present invention have been disclosed herein, the present invention is not limited to the disclosed embodiments. Instead, this application is intended to cover any variations, uses, or adaptations of the invention using its general principles. Therefore, this application is intended to cover such departures from the present disclosure as come within known or customary practice in the art to which this invention pertains.

The invention claimed is:

1. A method of assembling a felling head of a feller buncher comprising:
   first, placing a first spacer on an outside surface of a mandrel to form a mandrel subassembly;
   second, fitting a tapered roller preset bearing pack within a bore of a unitary housing, wherein the unitary housing includes a first shelf disposed a first distance from a first end of the housing and a second shelf disposed a second distance from a second end of the housing, wherein the fitting the tapered roller preset bearing pack within the housing includes fitting the tapered roller preset bearing pack against the second shelf and against a second bearing sidewall that is adjacent to the second shelf within the bore of the housing;
   third, inserting the mandrel subassembly in the bore of the housing;
   fourth, placing a second spacer on the outside surface of the mandrel such that a first end of the second spacer is in contact with the tapered roller preset bearing pack; and
   fifth, fitting a cylindrical roller preset bearing pack within the housing against the first shelf and against a first bearing sidewall that is adjacent to the first shelf within the bore of the housing, the cylindrical roller preset bearing pack also in contact with the second end of the second spacer.

2. The method of claim 1 further comprising prior to inserting the mandrel providing a flange and fixing the flange at a first end of the mandrel.

3. The method of claim 2, further comprising:
   assembling a saw motor with the unitary housing, the saw motor including a saw blade that is mounted to flange and configured to be rotationally driven by the saw motor.

4. The method of claim 1, wherein the second spacer provides a prescribed roller clearance between the tapered roller preset bearing pack and the cylindrical roller preset bearing pack.

5. The method of claim 1, further comprising:
   after the mandrel subassembly is inserted in the bore of the housing, attaching an end plate to the housing to maintain the cylindrical roller preset bearing pack adjacent to the second shelf.

6. The method of claim 1, wherein the outside surface of the mandrel includes an angled sidewall that is configured to locate the second spacer thereon.

7. The method of claim 1, wherein the tapered roller preset bearing pack includes a first row of tapered roller bearings and a second row of tapered roller bearings, the first row and second row of tapered roller bearings being arranged in an opposed configuration, such that the first row is configured to resist upward forces along the longitudinal axis of the mandrel while the second row is configured to resist downward forces along the longitudinal axis of the mandrel, wherein opposed ends of the tapered roller bearings of each of the first row of tapered roller bearing and the second row of tapered roller bearing are radially closer to the mandrel than the adjacent ends of tapered roller bearings are to the mandrel.

8. The method of claim 1, wherein the cylindrical roller preset bearing pack is displaced from the tapered roller preset bearing pack and configured to resist radial loads applied to the mandrel, the cylindrical roller preset bearing pack having a plurality of roller bearings wherein each of the plurality of roller bearings has an axis of rotation that is substantially parallel to the longitudinal axis of the housing.

* * * * *